No. 647,480. Patented Apr. 17, 1900.
F. DAMOUR.
VEHICLE.
(Application filed June 12, 1899.)

(No Model.)

Witnesses.
Clinton Finley
William Meagher

Inventor.
Ferdinand Damour

UNITED STATES PATENT OFFICE.

FERDINAND DAMOUR, OF BOLCKOW, MISSOURI.

VEHICLE.

SPECIFICATION forming part of Letters Patent No. 647,480, dated April 17, 1900.

Application filed June 12, 1899. Serial No. 720,181. (No model.)

*To all whom it may concern:*

Be it known that I, FERDINAND DAMOUR, of Bolckow, in the county of Andrew and State of Missouri, have invented certain new and useful Improvements in Motor-Vehicles; and I do hereby declare that the following is a full, clear, and exact description of the same to the best of my knowledge and belief.

My invention relates to an improvement in motor-vehicles, the object of the invention being to provide a motor-vehicle with simple and effective steering appliances by means of which the operator can easily and accurately steer the vehicle with his feet.

With this object in view the invention consists in certain novel features of construction and combinations and arrangements of parts, as will be more fully hereinafter described, and pointed out in the claims.

Figure 1:
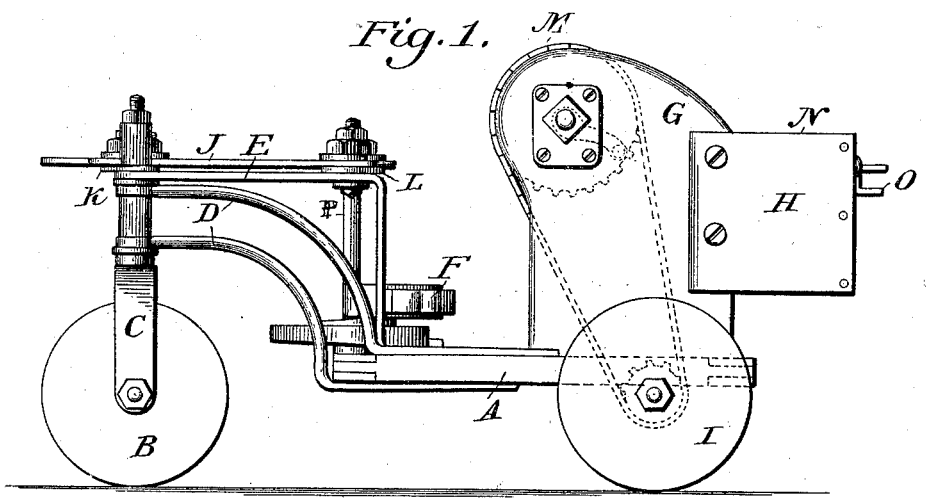
Figure 2:
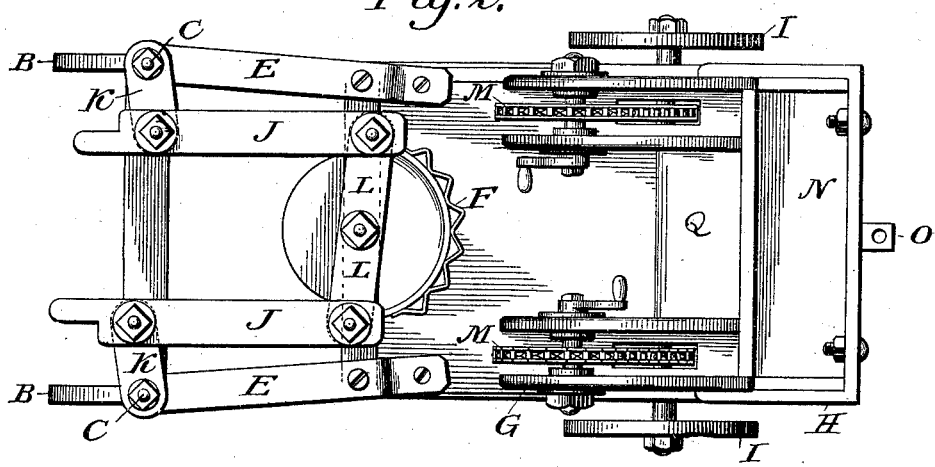

In the accompanying drawings, Figure 1 is a view in elevation, and Fig. 2 is a top plan view.

A represents the base of the vehicle-frame, to the forward end of which at each side are secured upwardly and forwardly extending parallel rods D, the forward ends of which terminate in collars in which tubular heads are secured. Vertical shafts C are mounted in said heads and provided with forks at their lower ends for the reception of steering-wheels B.

A drive-axle is revolubly mounted beneath the base A, at or near the rear end thereof, and wheels I are secured to said axle.

Propelling mechanisms M are mounted on the base A and connected with the axle to which the wheels I are secured, said propelling mechanisms being provided with cranks disposed in front of and in proximity to the rider's seat Q.

A suitable receptacle N may be secured to the rear of the vehicle, and a coupling O may be provided for connecting the motor-vehicle with a trailer.

An upright shaft P is provided at the forward central portion of the base A, and a cross-bar L is provided on the upper end of said shaft. The shaft P is supported in a cross-bar P', connecting two braces E, secured to the base A at one end and mounted on the shafts C at the other end. The cross-bar L is connected with inwardly-projecting arms K on the shafts C by means of links J.

A curved block is secured on the shaft P, at its lower end directly in front of the rider's seat, and provided on its inner curved edge with a corrugated or angular strip F, which will be so secured to the block as to always present a flat surface to the operator's foot and prevent slipping.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a vehicle, the combination with a body or frame, of two vertical shafts revolubly mounted at one end thereof and each having a forked lower end, wheels mounted in the forked ends of said shafts, a centrally-located revoluble shaft in rear of said first-mentioned shaft, a cross-bar secured to the upper end of the central shaft, links pivoted to the ends of said cross-bar and projecting forwardly therefrom and arms pivoted to the forward ends of said links and secured to the upper ends of said first-mentioned vertical shafts, and a block secured to the lower end of the central shaft, said block having a curved rear edge provided with a series of flat faces disposed successively at different angles for the reception of the foot of the operator.

2. In a vehicle, the combination with the body or frame and two steering-wheels, of a vertical shaft, a cross-bar at the upper end of said shaft, connections between the ends of said cross-bar and the respective steering-wheels, a curved block secured to the lower end of said shaft and a strip secured to the rear edge of said block and made to form a series of flat faces.

3. In a vehicle the combination with a body or frame, of arms projecting forwardly therefrom at each side, bearings at the forward ends of said arms, vertical shafts mounted in said bearings and having forks at their lower ends, wheels mounted in said forks, fixed angular bars secured at one end to the body or frame and loosely connected at their other ends to said shaft, a cross-bar connecting said angular bars, a centrally-located shaft mounted on the base and in said cross-bar, a curved corrugated block secured to the lower end of said central shaft, a cross-bar secured between its ends to the upper end of said central shaft, arms pivoted at their rear ends to the ends of said last-mentioned cross-bar and links pivoted to the forward ends of said arms and secured at their other ends to said first-mentioned shafts.

In testimony that I claim the foregoing as my own invention I hereto affix my signature in the presence of two witnesses.

FERDINAND DAMOUR.

Witnesses:
CLINTON FINLEY,
WILLIAM MEAGHER.